Aug. 25, 1953 G. MOUNTJOY 2,650,265

DUAL PURPOSE CARRIER WAVE RECEIVER

Filed Nov. 30, 1949

INVENTOR.
GARRARD MOUNTJOY

BY

ATTORNEY

Patented Aug. 25, 1953 2,650,265

UNITED STATES PATENT OFFICE 2,650,265

DUAL PURPOSE CARRIER WAVE RECEIVER

Garrard Mountjoy, Canandaigua, N. Y., assignor to Stromberg-Carlson Company, a corporation of New York Application November 30, 1949, Serial No. 130,288

8 Claims. (Cl. 178—5.8)

Figure 1:
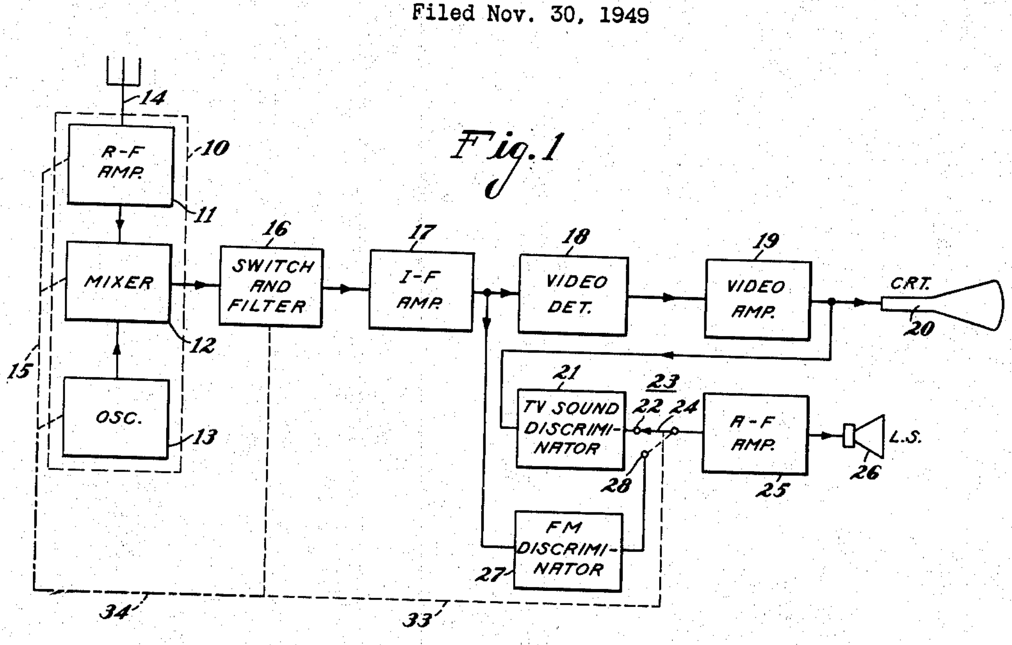

The present invention relates to dual-purpose carrier-wave receivers, and more particularly to a receiver capable of selectively receiving television broadcasts and frequency-modulation broadcasts.

In the conventional television receiver, a separate intermediate-frequency amplifier is provided for the sound carrier wave which, according to the present American standards, is frequency-modulated and occupies a bandwidth approximately 50 kilocycles wide. This sound-carrier intermediate-frequency amplifier supplies a conventional discriminator, which converts the modulated carrier signal to an audible frequency signal. If the tuner of such a conventional television receiver is adapted to cover the spectrum of frequencies within which frequency-modulation broadcasts are transmitted, it is a relatively simple matter to adapt the television receiver for the reception of such broadcasts. For this purpose, the tuner is tuned to the carrier frequency of the desired frequency-modulation broadcast station, and the received signal is amplified in the sound-carrier intermediate-frequency amplifier of the receiver and passed through the discriminator. The latter unit is preferably modified in a manner which permits it to handle the somewhat wider bandwidth of the frequency-modulation signal. Beyond these minor modifications, the conventional television receiver need not be changed in order to permit the reception of frequency-modulation broadcasts.

Recently, television receivers of the so-called intercarrier type have been introduced. A receiver of this type is disclosed, for example, in Parker Patent 2,448,908, issued September 7, 1948. In the intercarrier system of television reception, the picture and sound carrier waves are amplified together in a single intermediate-frequency amplifier. This amplifier has a relatively wide band-pass characteristic in order to accommodate the picture signal carrier. At the output of the picture second detector there appears a beat note which corresponds with the difference in frequency between the picture and sound carriers. This beat note is frequency-modulated in accordance with the sound signal and is, at least to some extent, amplitude-modulated in accordance with the picture signal. By passing this beat note through a frequency-modulation detector which is relatively insensitive to amplitude modulation, the sound modulation may be separated from the picture modulation and utilized in the customary manner, after suitable amplification, to operate a loud speaker. It will be apparent that, since an intercarrier television receiver does not have a separate intermediate-frequency amplifier of relatively narrow band-pass characteristic, such a receiver is not readily utilized for the reception of frequency-modulation broadcasts even if its tuner is designed to cover the frequency spectrum of such broadcasts.

It is an object of the present invention to provide a dual-purpose carrier-wave receiver which is selectively adapted for the reception of a first class of relatively wide-band signals and of a second class of relatively narrow-band signals.

It is another object of the present invention to provide a television receiver which is selectively adapted for the reception of frequency-modulation broadcasts.

Still another object of the invention is to provide, in a television receiver of the intercarrier type, means for selectively receiving frequency-modulation broadcasts.

A further object of the present invention is to provide a carrier-wave receiver of simplified construction which is adapted selectively to receive television broadcasts or frequency-modulation broadcasts.

In accordance with the present invention, there is provided a superheterodyne receiver of the type adapted to receive a first class of relatively wide-band signals, this receiver comprising a tuner adapted to cover a range of frequencies including at least one spectrum of this first class of signals and a second spectrum comprised of a second class of relatively narrow-band signals. The receiver also includes a relatively broad-band intermediate-frequency amplifier and a first discriminator responsive to the first class of signals. In combination with this receiver, there are provided means for selectively rendering the receiver capable of reception of the second class of signals. These means comprise means for introducing a relatively narrow-band filter between the tuner and the intermediate-frequency amplifier and means for simultaneously substituting a second discriminator for the first discriminator, the second discriminator being responsive to the second class of signals.

In accordance with another feature of the present invention, the means for rendering the receiver capable of reception of the second class of signals are actuated by the tuning means of the receiver when the tuning means is adjusted to cover the second spectrum of signals.

Still another feature of the present invention is to provide, in combination with a superheterodyne receiver of the intercarrier type, simple and efficient means for selectively rendering the receiver capable of reception of frequency-modulation broadcasts. If desired, such means may be arranged to be actuated automatically when the tuning means of the receiver is adjusted to cover a range of frequencies including the frequency-modulation broadcast spectrum.

Figure 2:
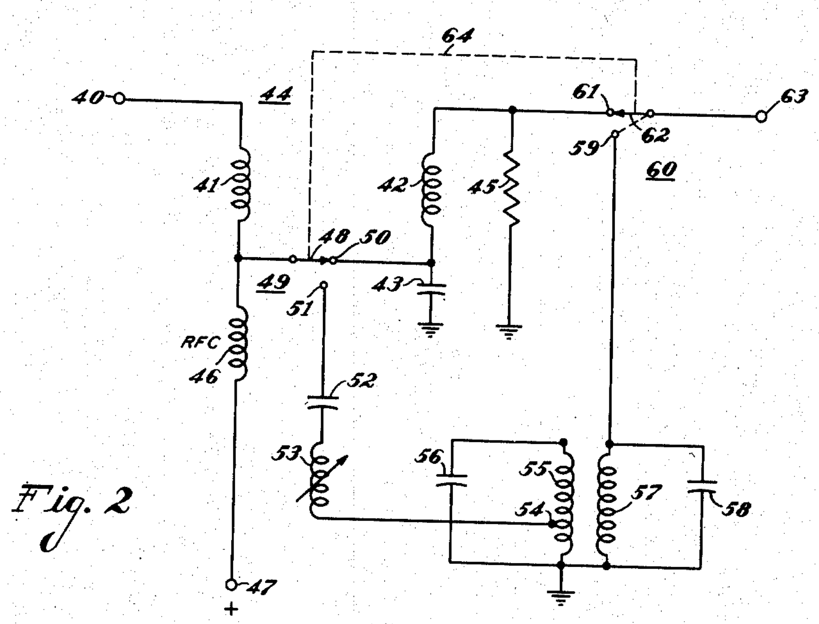

The above and other objects and features of the present invention will be better understood by referring to the following description taken in connection with the accompanying drawing, in which like reference numerals designate like components and in which:

Fig. 1 is a block diagram of a dual-purpose carrier-wave receiver in accordance with the present invention; and Fig. 2 is a schematic diagram of a portion of the receiver of Fig. 1.

Referring now to Fig. 1 of the drawing, there is shown a superheterodyne television receiver of the intercarrier type, modified in accordance with the present invention. The receiver of Fig. 1 includes a tuner 10, comprising a radio-frequency amplifier unit 11, a mixer unit 12 and an oscillator unit 13. The signals received by an antenna 14 are supplied to radio-frequency amplifier unit 11. Units 11, 12 and 13 are preferably ganged, as indicated by broken line 15, for simultaneous adjustment, to permit tuner 10 to be tuned over a range of frequencies including at least one spectrum used for television broadcasts and at least one spectrum used for frequency-modulation broadcasts.

The output of tuner unit 10 is supplied to a switch and filter unit 16 which in turn supplies an intermediate-frequency amplifier unit 17 having a relatively broad band-pass characteristic. The output of unit 17 is supplied to a video detector unit 18 which in turn supplies a video amplifier unit 19. The output of video amplifier unit 19 is supplied to a conventional picture or cathode-ray tube 20.

The output of video amplifier 19 is also supplied to a television sound discriminator unit 21. The output of discriminator 21 is connected to a first terminal 22 of a single-pole, double-throw switch 23, the movable arm 24 of which is connected to an audio-frequency amplifier 25, the output of which supplies a conventional loud speaker 26. The output of intermediate-frequency amplifier 17 is also supplied to a frequency-modulation discriminator 27, the output of which is connected to a second terminal 28 of switch 23.

Switch and filter unit 16 and switch 23 are preferably ganged together for simultaneous operation, as indicated by broken line 33. If desired, these units may also be ganged for actuation by tuning unit 10, as indicated by dot and dash line 34.

As shown in Fig. 1, the receiver is adjusted for the reception of television signals, and its operation for this purpose is conventional. When adjusted for television reception, the filter of unit 16 is not in use, and so there is no interference with the passage of both the sound and picture carrier waves produced by mixer 12 and supplied to intermediate-frequency amplifier 17. Switch 23 is in its upper position as shown, so that the beat note due to the interaction of the two carrier waves passes through television sound discriminator 21, and the resultant audio-frequency wave is supplied to audio-frequency amplifier 25 and reproduced by loud speaker 26.

Now let it be assumed that switch 23 is thrown to its downward position, and that a corresponding adjustment of unit 16 has been made so that the filter of this unit is introduced between mixer 12 and intermediate-frequency amplifier 17. Tuner 10 is now adjusted for the reception of a signal lying in the frequency-modulation broadcast spectrum. The filter of unit 16 has a relatively narrow band-pass characteristic which is centered around the nominal mid-frequency of the pass band of intermediate-frequency amplifier 17. Thus, by the combined action of the filter of unit 16 and intermediate-frequency amplifier 17, the frequency-modulation carrier wave at the output of mixer unit 12 is selectively amplified and other undesired signals which may be present are effectively eliminated. The resultant amplified frequency-modulation carrier wave is supplied to frequency-modulation discriminator 27 the output of which, due to the position of switch 23, is supplied to audio-frequency amplifier 25 and thence to loud speaker 26.

In a particular embodiment in accordance with Fig. 1 and adapted for use under present-day American broadcast standards, tuner unit 10 might be designed to cover either or both of the television frequency spectrums of 54–88 megacycles and 174–216 megacycles, either continuously or in channel-width steps, as well as the frequency-modulation spectrum of 88–108 megacycles. The filter of unit 16 might have a band-pass characteristic approximately 200 kilocycles wide centering around approximately 24 megacycles. Intermediate-frequency amplifier 17 might have a band-pass characteristic with a width of approximately 4 megacycles about a nominal mid-frequency of 24 megacycles. Television sound discriminator 21 would be responsive to a bandwidth of approximately 50 kilocycles with a mid-frequency of 4.5 megacycles, and frequency-modulation discriminator 27 would have a bandwidth of approximately 200 kilocycles centered about approximately 24 megacycles.

For the purposes of this application, it is assumed that discriminators 21 and 27 preferably include means for minimizing or substantially eliminating amplitude fluctuations. For example, if the discriminator itself is of the Foster-Seeley type, it may be preceded by one or more limiter stages. As an alternative, the discriminator unit may comprise a ratio detector. The particular internal arrangements of discriminators 21 and 27 do not constitute part of the present invention.

Fig. 2 is a schematic diagram of one form which switch and filter unit 16 of Fig. 1 may take. The input from mixer unit 12 (Fig. 1) is supplied to an input terminal 40, to which is connected an inductor 41 which, in combination with an inductor 42 and a capacitor 43, forms a band-pass filter 44 broadly tuned to a mid-frequency approximately corresponding to the mid-frequency of intermediate-frequency amplifier 17 (Fig. 1). A resistor 45 is connected between the upper terminal of inductor 42 and ground, and serves to adjust the band-pass characteristics of filter 44.

The lower terminal of inductor 41 is connected through a radio-frequency choke coil 46 to a source 47 of positive potential, it being assumed that terminal 40 is conductively connected to the anode of an electron discharge device (not shown) comprising a portion of mixer unit 12. The junction of inductor 41 and choke coil 46 is connected to the movable arm 48 of a single-pole, double-throw switch 49, one terminal 50 of which is connected to the junction of inductor 42 and capacitor 43, and the other terminal 51 of which is connected through a blocking capacitor 52 and an adjustable inductor 53 to a tap 54 on an inductor 55, the lower terminal of which is grounded as indicated.

A capacitor 56 is shunted across inductor 55, and an inductor 57, shunted by a capacitor 58, is coupled to inductor 55. One terminal of inductor 57 is grounded as indicated, and the other terminal is connected to a first terminal 59 of a single-pole, double-throw switch 60. The other terminal 61 of switch 60 is connected to the junction of inductor 42 and resistor 45. The movable arm 62 of switch 60 is connected to an output terminal 63, which in turn is connected to the input of intermediate-frequency amplifier 17 (Fig. 1). Switches 49 and 60 may be ganged for simultaneous operation, as indicated by broken line 64.

Circuit elements 55, 56, 57 and 58 comprise a lightly damped network which has a relatively narrow band-pass characteristic, as for example 200 kilocycles, centered about the nominal mid-frequency of the band-pass characteristic of intermediate-frequency amplifier 17 (Fig. 1). This mid-frequency may be approximately 24 megacycles. In operation for television reception, switches 49 and 60 are in the positions shown in Fig. 2, and circuit elements 41, 42 and 43 operate to provide a desired coupling characteristic of the television carrier waves from input terminal 40 to output terminal 63. For reception of frequency-modulation broadcasts, switches 49 and 60 are thrown to their lower positions, so that circuit elements 55, 56, 57 and 58 serve to provide a relatively sharply tuned band-pass characteristic to permit the desired frequency-modulation signal to pass from input terminal 40 to output terminal 63 and to provide a substantial degree of attenuation for other undesired signals.

It will be understood that both the television and the frequency-modulation filter arrangements shown by way of example in Fig. 2 are merely illustrative of the type of circuit configurations which are satisfactory for this purpose. Modifications may be made in either or both of these filters without departing from the scope of the present invention.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The combination with a superheterodyne receiver of the type adapted to receive a first class of relatively wide-band signals, said receiver comprising a tuner adapted to cover a range of frequencies including at least one spectrum of said first class of signals and a second spectrum comprised of a second class of relatively narrow-band signals, a relatively broad-band intermediate-frequency amplifier and a first discriminator responsive to said first class of signals, of means for selectively rendering said receiver capable of reception of said second class of signals, said means comprising means for inserting a relatively narrow-band filter between said tuner and said amplifier, and means for substituting, simultaneously with said insertion of said filter, a second discriminator for said first discriminator, said second discriminator being responsive to said second class of signals.

2. The combination with a superheterodyne receiver of the type adapted to receive a first class of relatively wide-band signals, said receiver comprising a tuner having tuning means adjustable to cover a range of frequencies including at least one spectrum of said first class of signals and a second spectrum comprised of a second class of relatively narrow-band signals, a relatively broad-band intermediate-frequency amplifier and a first discriminator responsive to said first class of signals, of means actuated by said tuning means when adjusted to cover said second spectrum for rendering said receiver capable of reception of said second class of signals, said means comprising means for inserting a relatively narrow-band filter between said tuner and said amplifier, and means for substituting, simultaneously with said insertion of said filter, a second discriminator for said first discriminator, said second discriminator being responsive to said second class of signals.

3. The combination with a superheterodyne receiver of the type adapted to receive a first class of signals each comprising a pair of spaced carriers, said receiver comprising a tuner adapted to cover a range of frequencies including at least one spectrum of said first class of signals and a second spectrum comprised of a second class of signals each having a single carrier, an intermediate-frequency amplifier adapted to handle signals of said first class and a first discriminator responsive to the frequency difference between said spaced carriers, of means for selectively rendering said receiver capable of reception of said second class of signals, said means comprising means for inserting a filter adapted to handle signals of said second class between said tuner and said amplifier, and means for substituting, simultaneously with said insertion of said filter, a second discriminator for said first discriminator, said second discriminator being responsive to the frequency resulting from the hetrodyning of said single carrier frequency.

4. The combination with a superheterodyne receiver of the type adapted to receive a first class of signals each comprising a pair of spaced carriers, said receiver comprising a tuner having tuning means adjustable to cover a range of frequencies including at least one spectrum of said first class of signals and a second spectrum comprised of a second class of signals each having a single carrier, an intermediate-frequency amplifier adapted to handle signals of said first class and a first discriminator responsive to the frequency difference between said spaced carriers, of means actuated by said tuning means when adjusted to cover said second spectrum for rendering said receiver capable of reception of said second class of signals, said means comprising means for inserting a filter adapted to handle signals of said second class between said tuner and said amplifier, and means for substituting, simultaneously with said insertion of said filter, a second discriminator for said first discriminator, said second discriminator being responsive to the frequency resulting from the heterodyning of said single carrier frequency.

5. The combination with a superheterodyne receiver of the type adapted to receive a first class of relatively wide-band signals each comprising a pair of spaced carriers, said receiver comprising a tuner adapted to cover a range of frequencies including at least one spectrum of said first class of signals and a second spectrum comprised of a second class of relatively narrow-band signals each having a single carrier, an intermediate-frequency amplifier adapted to handle signals of said first class and a first discriminator responsive to the frequency difference between said spaced carriers, of means for selectively rendering said receiver capable of reception of said second class of signals, said means comprising means for inserting a relatively narrow-band filter between said tuner and said amplifier, and means for substituting, simultaneously with said insertion of said filter, a second discriminator for said first discriminator, said second discriminator being responsive to the frequency resulting from the heterodyning of said single carrier frequency.

6. The combination with a superheterodyne receiver of the type adapted to receive a first class of relatively wide-band signals each comprising a pair of spaced carriers, said receiver comprising a tuner having tuning means adjustable to cover a range of frequencies including at least one spectrum of said first class of signals and a second spectrum comprised of a second class of relatively narrow-band signals each having a single carrier, an intermediate-frequency amplifier adapted to handle signals of said first class and a first discriminator responsive to the frequency difference between said spaced carriers, of means actuated by said tuning means when adjusted to cover said second spectrum for rendering said receiver capable of reception of said second class of signals, said means comprising means for inserting a relatively narrow-band filter between said tuner and said amplifier, and means for substituting, simultaneously with said insertion of said filter, a second discriminator for said first discriminator, said second discriminator being responsive to the frequency resulting from the heterodyning of said single carrier frequency.

7. The combination with a superheterodyne television receiver of the intercarrier type, said receiver comprising a tuner adapted to cover a range of frequencies including a frequency-modulation broadcast spectrum, a relatively broad-band intermediate-frequency amplifier, a video detector, an intercarrier sound discriminator fed with signals derived from said video detector, and an audio amplifier, of means for selectively rendering said receiver capable of reception of frequency-modulation broadcasts, said means comprising means for inserting a relatively narrow-band filter between said tuner and said intermediate-frequency amplifier, a frequency-modulation discriminator connected to the output of said intermediate-frequency amplifier, and means for altering, simultaneously with said insertion of said filter, the connection of the input of said audio amplifier from said intercarrier sound discriminator output to the output of said frequency-modulation discriminator.

8. The combination with a superheterodyne television receiver of the intercarrier type, said receiver comprising a tuner having tuning means adjustable to cover a range of frequencies including at least one television broadcast spectrum and a frequency-modulation broadcast spectrum, a relatively broad-band intermediate-frequency amplifier a video detector, and an intercarrier sound discriminator fed with signals derived from said video detector, and an audio amplifier, of means actuated by said tuning means when adjusted to cover said frequency-modulation broadcast spectrum for rendering said receiver capable of reception of frequency-modulation broadcasts, said means comprising means for inserting a relatively narrow-band filter between said tuner and said intermediate-frequency amplifier, a frequency-modulation discriminator connected to the output of said intermediate-frequency amplifier, and means for altering, simultaneously with said insertion of said filter, the connection of the input of said audio amplifier from said intercarrier sound output to the output of said frequency modulation detector.

GARRARD MOUNTJOY.

References Cited in the file of this patent

UNITED STATES PATENTS

| Number | Name | Date |
|---|---|---|
| 2,093,544 | Braden | Sept. 21, 1937 |
| 2,105,518 | Beers | Jan. 18, 1938 |
| 2,216,874 | Case | Oct. 8, 1940 |
| 2,258,599 | Carlson | Oct. 14, 1941 |
| 2,296,100 | Foster | Sept. 15, 1942 |
| 2,298,498 | Moore | Oct. 13, 1942 |
| 2,357,975 | Van B. Roberts | Sept. 12, 1944 |
| 2,394,917 | Kallmann | Feb. 12, 1946 |
| 2,408,644 | Huff | Oct. 1, 1946 |
| 2,448,908 | Parker | Sept. 7, 1948 |

FOREIGN PATENTS

| Number | Country | Date |
|---|---|---|
| 525,826 | Great Britain | Sept. 5, 1940 |

OTHER REFERENCES

Schematic Diagram for Admiral Combination Chassis 20 A1 with 4J1 FM-AM Radio Tuner Chassis, May 20, 1949. (Supplement to Service Letter No. 84, Copy Div. 16.)